Patented Nov. 17, 1953

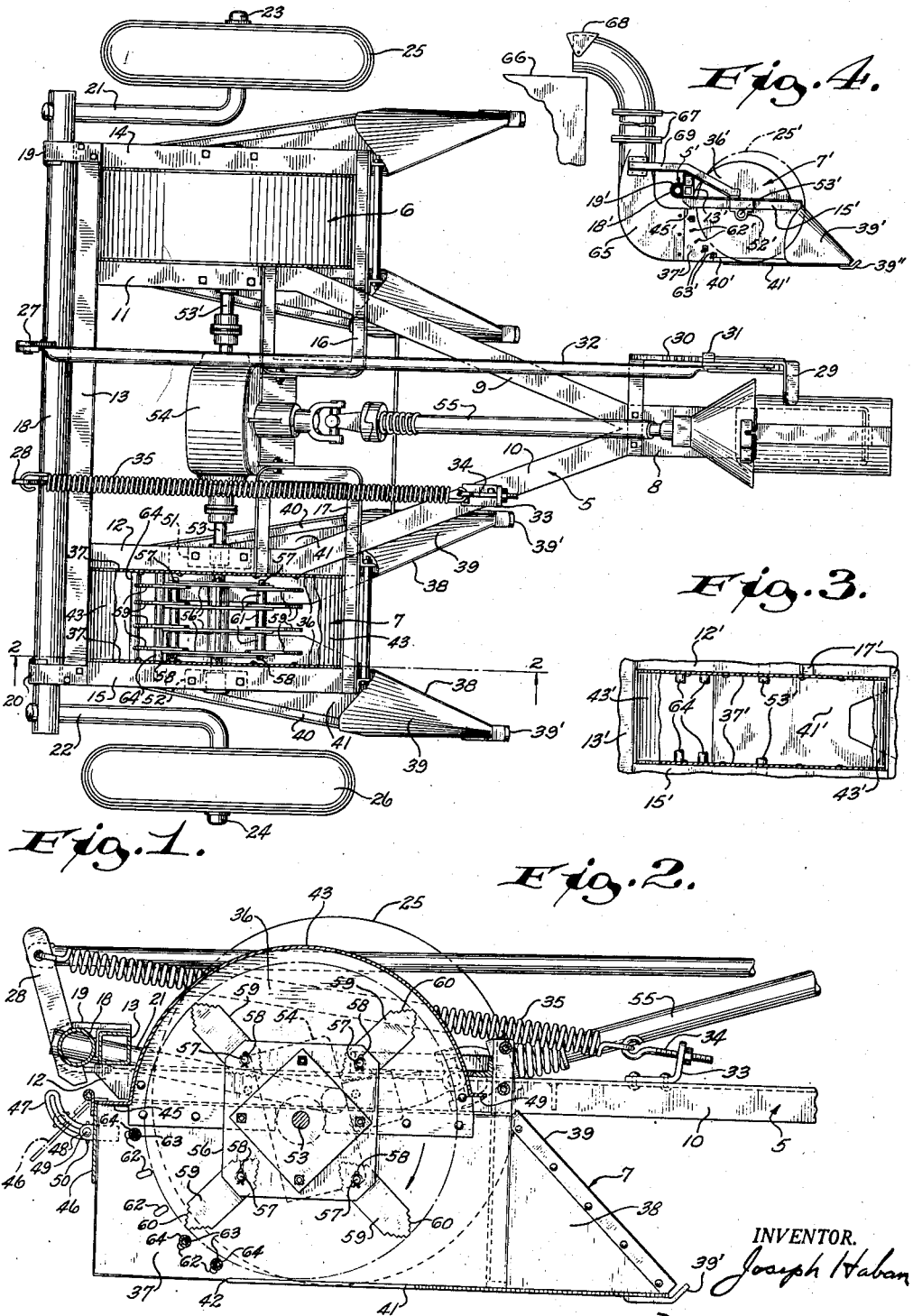

2,659,188

UNITED STATES PATENT OFFICE 2,659,188

FARM ROW CROP SHREDDER

Joseph Haban, Sturtevant, Wis.

Application March 31, 1950, Serial No. 153,224

14 Claims. (Cl. 55—118)

This invention relates to improvements in farm row crop shredders.

Certain row crops such as corn are frequently raised primarily for the purpose of obtaining seed. In the harvesting of corn a harvester may be used which cuts the corn and removes the ears therefrom, delivers said ears to a wagon thereadjacent, and discharges the stalks having the ears removed therefrom back onto the ground. If these stalks which are lying on the ground can be ground up into a finely shredded mulch and deposited back upon the ground, to be later plowed under, very desirable results are obtained.

The shredding of the corn stalks effectively destroys any corn borers in said stalks and thereby greatly reduces the incidence of infestation of future crops. Further, the mulch, when deposited back upon the ground, forms a layer which is moisture absorbent and which therefore retards soil erosion, not only before said mulch is mixed with the soil, but also afterward. In addition, finely shredded mulch, upon mixture with the soil, quickly decomposes and fertilizes the soil.

Heretofore devices have been proposed for shredding stalks which are on the ground without actually picking the stalks up, but these devices have not produced as efficient a shredding action as is desired, and a desired and uniform degree of fineness has not been obtained.

While it has been recognized that an enclosed hammer mill is an efficient shredding device, such device has heretofore been used principally for the grinding of material to provide feed, and it has been heretofore considered impractical to use an enclosed hammer mill for the present purpose, as it was thought that this would require a separate pickup device, an elevating conveyor to elevate material from the ground to the hammer mill, and means for directing the shredded stalks back onto the ground. This would be too expensive a machine for the present purpose.

It is a general object of the present invention to provide a simple and inexpensive device of the class described wherein an enclosed hammer mill is so utilized that stalks or the like which are lying on the ground may be subjected to destructive action in an enclosed hammer mill chamber while the hammer mill is being moved over a field and wherein the stalks on the ground are picked up directly into the feed opening of an enclosed hammer mill and discharged therefrom without employing any elaborate and expensive feeding, elevating and discharge mechanism.

It is a further object of the present invention to provide an improved farm implement which is relatively simple in construction and which is adapted to be drawn through a field where there are corn stalks or other material lying on the ground, said implement being operable to grind said crop into a finely shredded mulch and to discharge said mulch back upon the ground rearwardly thereof.

A further object of the invention is to provide an improved device of the class described which is so constructed that the stalks entering said device are initially subjected by the hammers to a splitting action with the grain thereof rather than to a cross-wise action, thereby reducing the power requirements of the shredding operation to a minimum.

A further object of the invention is to provide an improved shredder having means for directing the shredded material discharged therefrom into an adjacent vehicle.

A further object of the invention is to provide a device of the class described wherein the discharge opening thereof is provided with an adjustable grate, the size of the openings therein being variable to control the degree of fineness to which the crop is to be ground before it is discharged through said openings.

A further object of the invention is to provide a device of the class described having a feed opening, the height of the feed opening being relatively large as compared with the width thereof to permit the rotating hammer unit to feed itself by pulling stalks in through the feed opening to thereby prevent jamming at said feed opening.

A further object of the invention is to provide an implement of the class described wherein the hammer mill may be provided with a slot in its bottom wall through which upstanding stubble from the field may project, thereby providing for thorough shredding of said stubble as well as shredding of the previously cut stalks or the like.

A further object of the invention is to provide a device of the class described wherein the discharge opening is provided with a hinged gate and wherein there is means for selectively securing the gate in various positions or alternatively for permitting the gate to float on the impact of the discharged mulch so as to control the spread of said discharged mulch on the soil and to prevent said discharge from being thrown into the air where wind might carry it back toward the operator.

A further, more specific object of the invention is to provide a device of the class described wherein the discharge grate is comprised of spaced removable bolts extending transversely across the discharge opening, and wherein the degree of fineness of the discharged mulch can be varied by the adding or removing of one or more of said bolts.

A further object of the invention is to provide a device of the class described which is strong and durable, which requires a relatively small amount of power to operate, and which is otherwise well adapted for the purposes described.

With the above and other objects in view, the invention consists of the improved farm row crop shredder and all of its parts and combinations, as set forth in the claims, and all equivalents thereof.

In the drawing accompanying and forming a part of this specification, wherein is shown one complete embodiment of the preferred form of the invention, and wherein like characters of reference indicate the same parts in all of the views:

Fig. 1 is a fragmentary plan view of a double unit farm row crop shredder made in accordance with the invention, parts being broken away for clarity;

Fig. 2 is a fragmentary longitudinal vertical sectional view taken approximately along the line 2—2 of Fig. 1 and on an enlarged scale;

Fig. 3 is a fragmentary plan view of a modified form of the invention showing the use of a single bottom plate, parts being broken away for clarity; and Fig. 4 is a fragmentary side view of a modified form of the invention wherein a shredding unit is provided with a discharge duct, parts being broken away for clarity.

Referring to Fig. 1 of the drawing, the numeral 5 indicates a frame structure with which is associated a pair of the improved farm row crop shredding devices 6 and 7. The frame structure 5 comprises a Y-shaped member 8 having a pair of rearwardly extending diverging arm portions 9 and 10 which respectively merge into a pair of spaced parallel rearwardly extending arm portions 11 and 12. Fixed to and extending transversely of the arm portions 11 and 12 is a structural member 13 which may be box-shaped in cross section, as shown in Fig. 2. A pair of structural members 14 and 15 are fixed to the outer ends of the member 13 and extend forwardly therefrom parallel with the arm portions 11 and 12 and outwardly thereof, as shown. A pair of horizontally extending J-shaped structural members 16 and 17 may have the longer legs thereof extending transversely of and fixedly connected to the front end portions of the members 14 and 15 and to the divergent portions 9 and 10 of the member 8, said J-shaped members forming loops extending inwardly from said divergent portions and having the short ends thereof fixed to the arm portions 11 and 12 respectively, as shown in Fig. 1.

A structural member 18, preferably tubular, is journalled in a pair of bearings 19 and 20 which are fixed to the opposite end portions of the structural member 13 and which project rearwardly thereof. The tubular member 18 projects outwardly beyond the bearings 19 and 20, and projecting at right angles from the member 18 at the opposite ends thereof are a pair of coplanar L-shaped wheel supporting members 21 and 22. The members 21 and 22 have outwardly projecting portions 23 and 24 which form stub axles on which are rotatably mounted a pair of wheels 25 and 26, the latter being preferably provided with pneumatic tires. The wheels extend in vertical planes parallel with the structural members 14 and 15.

Projecting upwardly from an intermediate portion of the member 18 are a pair of spaced lugs 27 and 28, said lugs being apertured at their upper ends. Mounted on the portion 8 of the structural member 5 in longitudinal alignment with the lug 27 is a pivotally mounted lever 29 which is provided with an arcuate rack 30 and with a releasable locking dog 31, the latter being cooperable with said rack to selectively position said lever. Pivotally connected at one end to the lug 27 and pivotally connected at its opposite end to an intermediate portion of the lever 29 is an elongated preferably tubular link 32.

Fixed to the arm 10 of the structural member 5 in longitudinal alignment with the lug 28 is an apertured anchoring bracket 33 to which is adjustably connected an eye-bolt 34. A helical tension spring 35 is connected to the apertured outer end of the leg 28 at one of its ends and is connected to the eye bolt 34 at its other end. It is apparent that by adjusting the position of the lever 29, the vertical position of the wheels 25 and 26 relative to the frame 5 may be simultaneously varied. This action raises or lowers the frame 5 relative to the ground. The structure is such that when the frame 5 is lowered, the spring 35 is stretched by the weight of the frame, and when the frame 5 is raised, the tension of the spring 35 aids the operator due to its tendency to return to its normal unstretched condition, thereby aiding in raising the frame.

The improved shredding units 6 and 7 are substantially identical, so only one will be described in detail.

Fixed (as by riveting) to and extending vertically along the facing surfaces of the arm 12 and the member 15 are a pair of upstanding, parallel, semi-circular side wall plates 36. Fixed, as by riveting, to the lower edge portion of the semicircular side wall plates 36 are a pair of depending parallel, generally rectangular, vertical lower side wall plates 37. The forward ends of the side wall plates 37 are formed with divergent triangular portions 38. Fixed, as by riveting, to the upper edges of the triangular portions 38 of the plates 37, are arcuate outwardly flaring shrouds 39 which form with the portions 38 crop gathering pick-up points. The forward tip of each of said pick-up points is provided with an upturned runner member 39' projecting forwardly from its lower surface.

A pair of horizontal diverging angle members 40 extend forwardly and outwardly from the lower rear end portions of the plates 37 to the lower outward and rearward portions of the shrouds 39. A pair of opposite, horizontally extending bottom plates 41 are fixed to the undersides of the angle members 40 and to the lower edges of the side wall plates 37, extending from the tips of the pick-up points rearwardly to a point 42 spaced a predetermined distance from the rear edges of the plates 37, as indicated at Fig. 2. The plates 41 extend inwardly of the side wall plates 36 toward each other and are spaced apart at their inner edges a predetermined distance, said plates in effect functioning as a bottom plate formed with a central, longitudinally extending slot, the purpose of which will be described hereinafter. An arcuate plate 43 is fixed at its side edges to the arcuate upper edges of the side wall plates 36, said arcuate plates having a forwardly extending horizontal flange 44 and having a rearwardly extending horizontal flange 45, the latter being fixed at its edges to the rear upper edge portions of the plate 37.

Hinged to the flange 45, for pivotal movement on a horizontal axis, is a door or gate 46 which extends transversely across the rear edges of the spaced side wall plates 37. An arcuate slotted bracket 47 is fixed to one of the side wall plates 37, and the gate 46 is provided with a lug 48 having a bolt 49 which projects through the slot in the member 47, there being a wing nut 50 threaded on the bolt on the opposite side of the bracket 47. It is apparent that the gate 46 may be permitted to swing freely about its pivot, or it may be fixed in any selected position, such as that indicated by the dot and dash lines of Fig. 2, by tightening the wing nut 50.

Fixed to the arm 12 and to the member 15 are a pair of bearings 51 and 52 respectively, in which bearings a transverse horizontal shaft 53 is rotatably journalled. The shaft 53 extends through suitable apertures in the side wall plates 36 and 37, said shaft extending inwardly beyond the arm 12 to a suitable connection with a gear box 54. The gear box 54 may be supported by bolting the same to the inner looped portions of the J-shaped members 16 and 17. A shaft 53' which is similar to the shaft 53, extends inwardly from the unit 6 to a similar coupling with the gear box 54. A drive shaft 55, provided with suitable universal joints, extends forwardly and upwardly from the gear box 54 and is provided at its forward end with suitable connections (not shown in detail) which are adapted to cooperate with the power take-off of the conventional tractor.

Fixed to the shaft 53 between the side wall plates 36 are preferably four spaced parallel, generally square plates 56. The corresponding edges of the plates 56 are preferably coplanar, and said plates are formed with corresponding aligned apertures adjacent each corner thereof. A transverse shaft 57 extends through the aligned apertures at each corner of the plates 56, and is fixed against axial movement by cotter pins 58 at each end thereof, outwardly of the outermost plates 56. Swingably mounted on each of the shafts 57 adjacent the plates 56 are preferably four hammers 59. The hammers 59 may be formed of flat bars of equal length having serrated outer edges 60. Spacer sleeves 61 are positioned on the shafts 57 to properly space the hammers 59 on the same shaft 57 from each other and to stagger the hammers of one shaft 57 from those of adjacent shafts. It will be noted that the length of the hammers 59 is such that upon rotation, the outer ends thereof come close to but do not touch the plane of the upper surface of the plates 41, as indicated by the circular dot and dash line in Fig. 2.

The side plates 37 are formed with a plurality of aligned elongated slots 62 which are disposed in an arcuate path rearwardly adjacent the path of the outer ends of the hammers 59, as indicated by the circular dotted line in Fig. 2. The longitudinal axes of said slots extend preferably radially with respect to the shaft 53, and removably positioned in certain of said slots are elongated, transversely extending bolts 63 having spacer sleeves 64 positioned thereon, the opposite ends of said sleeves abutting the inner surfaces of the plates 37.

During operation, the drive shaft 55 is rotated from the power take-off of the tractor. The shaft 53 is thereby rotated at high speed and the plates 56, which, along with the hammers 59 form a rotary hammer unit, are rotated by said shaft at high speed in a clockwise direction, as viewed in Fig. 2. As the improved shredder is drawn over ground strewn with corn stalks, the gathering points funnel said stalks inwardly directly into the opening in the hammer mill housing formed between the forward ends of the side wall plates 37 and below the horizontal forward flange 44 of the arcuate plate 43. As soon as the hammers 59 engage any of said stalks said stalks are pulled in through the feed opening by said hammers. The height of the feed opening in the improved pulverizer is relatively large compared with the width thereof, thereby permitting the hammers 59 to rapidly pull stalks through said opening without any danger of jamming of said stalks at said opening. The hammer mill is, therefore, self-feeding and no separate mechanism for picking up, elevating and feeding is required.

The stalks which enter the feed opening are thoroughly shredded to a degree of fineness which can be readily controlled by the operator in the manner to be later described. If desired, for example, corn stalks can be reduced to fine fibers by the improved shredder. One of the principal reasons for the thorough shredding or grinding action of the improved machine, which action has not been possible with machines heretofore developed, is the fact that the rotary hammer unit operates in a chamber which is enclosed except for the feed and the discharge openings.

The feed opening has previously been pointed out. The discharge opening is the opening between the rear edges of the side plates 37 and below the rear horizontal flange 45. The bolts 63 and their sleeves 64, extend transversely across the discharge opening, and are positioned immediately adjacent the path of the tips of the rotary hammers, to form a grate which controls the size of the mulch passing therethrough. The sidewalls 36 and 37, along with the top wall 43 and the bottom plates 41 form the aforementioned chamber in which the rotary hammer unit is enclosed.

The material being ground or shredded by the improved machine is confined in this enclosed chamber until it has been reduced to the fineness required for it to be able to pass through the discharge grate. It is obvious that with the hammer unit rotating at high speed, material confined in a chamber therewith is rapidly reduced to the predetermined degree of fineness by the action thereon of the relatively large number of hammers moving in said chamber at such high speed.

The construction of the improved machine is such that the stalks are pulled and funnelled into the chamber in substantial parallelism. The stalks, as drawn into the chamber, are alined with the planes of movement of the rapidly moving hammers therein. Because of this alinement, the hammers initially split the stalks with the grain thereof rather than cut through said stalks in a crosswise direction. This arrangement reduces the power requirement of shredding operation to a minimum, since much less power is required to shred the stalks by splitting action with the grain than is required to do so by a chopping action cross-wise of the grain.

It will be noted that the bottom of the enclosed chamber above mentioned is formed with a longitudinal slot as a result of the spacing apart of the plates 41. The embodiment of the invention shown in Figs. 1 and 2 is designed primarily for use in shredding corn or the like, and the above-mentioned longitudinal slot is provided to permit the projection therethrough of a row of upstanding corn stubble. By reason of the slotted construction of the bottom wall in the casing of the improved machine, not only is the harvested crop thoroughly shredded, but the upstanding stubble is also thoroughly shredded. The plates 41 travel along in contact with the ground and thereby preserve the enclosing integrity of the rotary hammer chamber. The relatively narrow strip of ground surface exposed between the plates 41 in effect forms with the plates 41 a continuous bottom wall.

When the improved machine is used on crops other than corn, which have no appreciable upstanding stubble to be shredded, a modified form of the invention may be used which provides more complete enclosure of the rotary hammer unit by the casing. A machine of this type is shown in the fragmentary plan view of Fig. 3, wherein all of the parts are identical with corresponding parts of the principal form of the invention except for the bottom plate 41'. The identical parts of the modified form are indicated by the same numerals as the parts of the principal form, except that the numerals of the modified form are primed. In the modified form of the invention a single bottom plate 41' extends horizontally between the lower edges of the side plates 37' and replaces the two spaced plates 41 of the principal form of the invention. The plate 41' extends underneath the rotary hammer unit for the entire width of the chamber and forms the bottom wall of said chamber.

Any suitable number of bolts 63 and sleeves 64 may be positioned in the slots 62 for controlling the degree of fineness of the mulch discharged by the improved machine. Experience has shown that when three bolts 63 and sleeves 64 are disposed in the manner shown in Fig. 2 the improved machine produces, from corn stalks, finely shredded, fibrous mulch which is free from corn borer infestation and which has the desirable attributes of tending to retard soil erosion and of promoting rapid soil-fertilizing decomposition.

During operation of the improved machine, the door 46 controls the spread of the mulch being discharged from the improved machine and prevents said mulch from being thrown into the air where it can be carried toward the operator by the wind. Not only does the door 46 prevent the discharged mulch from being thrown upwardly, but it also deflects the discharged mulch in such a manner that it is distributed over the ground relatively evenly, rather than in concentrated areas. Depending upon the nature of the crop, the wind conditions, and the extent of area over which it is desired to spread the discharged mulch, the door 46 may be permitted to swing freely and to float on the impact of the discharged mulch, or said door may alternatively be fixed in any desired angular position within the range permitted by the bracket 47, by tightening the wing bolt 50.

There are instances when it is desirable to use the shredded mulch at a location other than in the field in which it is shredded. In Fig. 4 is shown a modified form of the invention which makes this possible. Fig. 4 shows a fragmentary side elevational view of a shredder unit 7' and associated parts. The parts which are indicated by prime numerals in Fig. 4 are substantially identical to the parts indicated by the same numerals unprimed in Figs. 1 and 2.

It will be noted that in the modification of the invention shown in Fig. 4 the swingable door 46 and the bracket 47 are omitted. Connected to the rear edge portions of the lower side wall plates 37' and to the rear edge portion of the rearwardly extending flange 45' is one end of a duct 65, said end being in registration with the discharge opening of the unit 7'. The duct 65 may be suitably supported on the frame 5' as by the brackets 69 connected to said frame, as shown. The duct 65 preferably extends rearwardly and upwardly, as shown, having an arcuate upper end which projects rearwardly. The duct 65 is of sufficient length so that the upper end thereof can be directed into an open vehicle, such as a wagon 66, which may be drawn along with the shredder 7'. The duct 65 may have one or more swivel joints 67 which permit the upper end thereof to be easily swung to various positions, as required. In addition, the upper end of the duct 65 may also be provided with a pivotally mounted deflector 68.

In operation, the shredded mulch is discharged with substantial force through the discharge opening of the unit 7', and it enters the duct 65 from which it is discharged, at the upper end thereof into the vehicle 66. The swivel joints 67 and the deflector 68 facilitate the handling of the discharged mulch by providing means for directing said mulch toward any desired portion of the vehicle body. The shredded mulch may then be transported in the vehicle 66 to any desired location of use.

Various changes and modifications may be made without departing from the spirit of the invention, and all of such changes are contemplated, as may come within the scope of the appended claims.

What I claim is:

1. In a farm row crop shredder having a wheeled supporting frame adapted to be moved through a field: a rotary hammer unit mounted on said frame for rotation on a horizontal axis, said unit including a plurality of swingably mounted hammer bars; and a casing carried by said frame and surrounding said hammer unit to form an enclosed chamber within which said unit is rotatable, said casing comprising: a pair of opposing side walls; a top wall; and a bottom wall between said side walls directly below and close to the lowermost portion of the path of movement of the hammer unit, said casing being mounted on said frame so that said bottom wall is moved along the surface of a field when said shredder is in use, said casing having a forward feed opening adjacent said hammer unit and bottom wall for the reception of the row crop which is projected therethrough by movement of the shredder along a crop row, and said casing also having an opening for the discharge therefrom of portions of the crop which have been shredded by said hammer unit.

2. In a farm row crop shredder having a wheeled supporting frame adapted to be moved through a field: a rotary hammer unit mounted on said frame for rotation on a horizontal axis, said unit including a plurality of swingably mounted hammer bars; and a casing carried by said frame and surrounding said hammer unit to form an enclosed chamber within which said unit is rotatable, said casing comprising: a pair of opposing side walls; a top wall; and a bottom wall between said side walls directly below and close to the lowermost portion of the path of movement of the hammer unit, said casing being mounted on said frame so that said bottom wall is moved along the surface of a field when said shredder is in use, said casing having a forward feed opening adjacent said hammer unit and bottom wall for the reception of the row crop which is projected therethrough by movement of the shredder along a crop row, and said casing also having an opening for the discharge therefrom of portions of the crop which have been shredded by said hammer unit, there being radial clearance between the circular path of the tips of said hammer bars and said bottom wall not substantially greater than that necessary to prevent contact of said hammer bars with said bottom wall.

3. In a farm row crop shredder having a wheeled supporting frame adapted to be moved through a field: a rotary hammer unit mounted on said frame for rotation on a horizontal axis, said unit including a plurality of swingably mounted hammer bars; and a casing carried by said frame and enclosing said hammer unit to form a chamber within which said unit is rotatable, said casing comprising: a pair of opposing side walls projecting downwardly beyond the lowermost portion of said hammer unit; a top wall; and a bottom wall between said side walls underneath and adjacent said hammer unit and fixed to the lower edge of at least one of said side walls, said casing being mounted on said frame so that said bottom wall is moved along the surface of a field when said shredder is in use, said casing having a forward feed opening adjacent said hammer unit and bottom wall for the reception of the row crop which is projected therethrough by movement of the shredder along a crop row, and said casing also having an opening for the discharge therefrom of portions of the crop which have been shredded by said hammer unit.

4. In a farm row crop shredder having a wheeled supporting frame adapted to be moved through a field: a rotary hammer unit mounted on said frame for rotation on a horizontal axis, said unit including a plurality of swingably mounted hammer bars; and a casing carried by said frame and enclosing said hammer unit to form a chamber within which said unit is rotatable, said casing comprising: a pair of opposing side walls projecting downwardly beyond the lowermost portion of said hammer unit; a top wall; and a horizontal bottom wall plate connected to the lower edge of each of said side walls and extending toward each other underneath and adjacent said hammer unit with their inner edges spaced apart a predetermined distance to provide a longitudinally extending slot therebetween of substantially less width than the spacing between said side walls, said casing being mouned on said frame so that said bottom wall plates are moved along the surface of a field when said shredder is in use, said casing having a forward feed opening adjacent said hammer unit and communicating with said bottom wall slot for the reception of the unsevered row crop which is projected therethrough and through said slot by movement of the shredder along a crop row, and said casing also having an opening for the discharge therefrom of portions of the crop which have been shredded by said hammer unit.

5. In a farm row crop shredder having a wheeled supporting frame adapted to be moved through a field: a rotary hammer unit mounted on said frame for rotation on a horizontal axis, said unit including a plurality of swingably mounted hammer bars; and a casing carried by said frame and surrounding said hammer unit to form an enclosed chamber within which said unit is rotatable, said casing comprising: a pair of opposing side walls; a top wall; a bottom wall between said side walls directly below and close to the lowermost portion of the path of movement of the hammer unit, said casing being mounted on said frame so that said bottom wall is moved along the surface of a field when said shredder is in use, said casing having a forward feed opening adjacent said hammer unit and bottom wall for the reception of the row crop which is projected therethrough by movement of the shredder along a crop row, and said casing also having an opening for the discharge therefrom of portions of the crop which have been shredded by said hammer unit; and a plurality of rod-like members removably mounted on said casing and extending across said discharge opening, said members being spaced apart a distance substantially greater than their diameter and providing a grate through which the shredded crop portions must pass upon discharge from said casing, said grated discharge opening constituting the only discharge opening of the shredder.

6. In a farm row crop shredder having a wheeled supporting frame adapted to be moved through a field: a rotary hammer unit mounted on said frame for rotation on a horizontal axis with the latter extending transversely of the path of movement of said frame, said unit including a plurality of swingably mounted hammer bars; and a casing carried by said frame and enclosing said hammer unit to form a chamber within which said unit is rotatable, said casing comprising: a pair of spaced parallel side walls positioned on opposite sides of said hammer unit and transversely of the axis of rotation thereof, said side walls extending beyond the path of rotation of said hammer unit in all radial directions from the axis of said unit; a substantially semicircular arcuate top wall positioned above said hammer unit and extending from front to rear substantially co-axial with said unit; and a bottom wall between said side walls below and close to the lowermost portion of the path of movement of said hammer unit, said casing being mounted on said frame so that said bottom wall is moved along the surface of a field when the shredder is in use, said casing having a forward feed opening adjacent said hammer unit and between the forward end of said arcuate top wall and said bottom wall and also between said side walls for the reception of the row crop which is projected therethrough by movement of the shredder along a crop row, and said casing also having a discharge opening between the rear end of said arcuate top wall and said bottom wall and also between said side walls for the rearward discharge of portions of the crop which have been shredded by said hammer unit.

7. In a farm row crop shredder having a wheeled supporting frame adapted to be moved through a field: a rotary hammer unit mounted on said frame for rotation on a horizontal axis with the latter extending transversely of the path of movement of said frame, said unit including a plurality of swingably mounted hammer bars; and a casing carried by said frame and enclosing said hammer unit to form a chamber within which said unit is rotatable, said casing comprising: a pair of spaced parallel side walls positioned on opposite sides of said hammer unit and transversely of the axis of rotation thereof, said side walls extending beyond the path of rotation of said hammer unit in all radial directions from the axis of said unit; a substantially semi-circular arcuate top wall positioned above said hammer unit and extending from front to rear substantially co-axial with said unit; a bottom wall between said side walls below and close to the lowermost portion of the path of movement of said hammer unit, said casing being mounted on said frame so that said bottom wall is moved along the surface of a field when the shredder is in use, said casing having a forward feed opening adjacent said hammer unit and between the forward end of said arcuate top wall and said bottom wall and also between said side walls for the reception of the row crop which is projected therethrough by movement of the shredder along a crop row, and said casing also having a discharge opening between the rear end of said arcuate top wall and said bottom wall and also between said side walls for the rearward discharge of portions of the crop which have been shredded by said hammer unit; and a plurality of horizontal bolts removably fixed to said casing side walls and extending across said discharge opening, said bolts being spaced apart a distance greater than their diameters and constituting a grate through which the shredded crop portions must pass to be discharged from the housing.

8. In a farm row crop shredder having a wheeled supporting frame adapted to be moved through a field: a rotary hammer unit mounted on said frame for rotation on a horizontal axis with the latter extending transversely of the path of movement of said frame, said unit including a plurality of swingably mounted hammer bars; and a casing carried by said frame and enclosing said hammer unit to form a chamber within which said unit is rotatable, said casing comprising: a pair of spaced parallel side walls positioned on opposite sides of said hammer unit and transversely of the axis of rotation thereof, said side walls extending beyond the path of movement of said hammer unit in all radial directions from the axis of said unit; a substantially semi-circular arcuate top wall positioned above said hammer unit and extending from front to rear substantially co-axial with said unit; a bottom wall between said side walls below and close to the lowermost portion of the path of movement of said hammer unit, said casing being mounted on said frame so that said bottom wall is moved along the surface of a field when the shredder is in use, said casing having a forward feed opening adjacent said hammer unit between the forward end of said arcuate top wall and said bottom wall and also between said side walls for the reception of the row crop which is projected therethrough by movement of the shredder along a crop row, and said casing also having a discharge opening substantially entirely below the axis of rotation of said hammer unit and between the rear end of said arcuate top wall and said bottom wall and also between said side walls for the rearward discharge of portions of the crop which have been shredded by said hammer unit; and an adjustable grate in said discharge opening formed of at least two spaced parallel horizontal bolts removably supported at their opposite ends by said side plates.

9. In a farm row crop shredder having a wheeled supporting frame adapted to be moved through a field; a rotary hammer unit mounted on said frame for rotation on a horizontal axis with the latter extending transversely of the path of movement of said frame, said unit including a plurality of swingably mounted hammer bars; and a casing carried by said frame and enclosing said hammer unit to form a chamber within which said unit is rotatable, said casing comprising: a pair of spaced parallel side walls positioned on opposite sides of said hammer unit and transversely of the axis of rotation thereof, said side walls extending beyond the path of movement of said hammer unit in all radial directions from the axis of said unit and having lower edges extending below said hammer unit; a substantially semi-circular arcuate top wall positioned above said hammer unit and extending from front to rear substantially co-axial with said unit; and a horizontal bottom plate connected to the lower edge of each of said side walls, said plates extending toward each other and having their inner edges spaced apart a predetermined distance to provide a longitudinally extending slot therebetween, said casing being mounted on said frame so that said bottom plates are moved along the surface of a field when said shredder is in use, said casing having a forward feed opening which communicates with said slot and which is adjacent said hammer unit and between the forward end of said arcuate top wall and said bottom wall for the reception of the unsevered row crop which is projected therethrough by movement of the shredder along a crop row, and said casing also having a discharge opening between the rear end of said arcuate top wall and said bottom wall portion and also between said side walls for the rearward discharge of portions of the crop which have been shredded by said hammer unit.

10. In a farm row crop shredder having a wheeled supporting frame adapted to be moved through a field: a rotary hammer unit mounted on said frame for rotation on a horizontal axis, said unit including a plurality of swingably mounted hammer bars; and a casing carried by said frame and enclosing said hammer unit to form a chamber within which said unit is rotatable, said casing comprising: a pair of opposing side walls having lower edges projecting downwardly beyond the lowermost portion of said hammer unit; a top wall; and a bottom wall under and adjacent said hammer unit and fixed to and extending between the lower edges of said side walls, said casing being mounted on said frame so that said bottom wall is moved along the surface of a field when the shredder is in use, said casing having a forward feed opening adjacent said hammer unit and bottom wall for the reception of the row crop which is projected therethrough by movement of the shredder along a crop row, and said casing also having an opening for the discharge therefrom of portions of the crop which have been shredded by said hammer unit.

11. In a farm row crop shredder having a wheeled supporting frame adapted to be moved through a field: a rotary hammer unit mounted on said frame for rotation on a horizontal axis, said unit including a plurality of swingably mounted hammer bars; and a casing carried by said frame and enclosing said hammer unit to form a chamber within which said unit is rotatable, said casing comprising: a pair of opposing side walls having lower edges projecting downwardly beyond the lowermost portion of said hammer unit; a top wall; a horizontal bottom wall under and adjacent said hammer unit and fixed to and extending between the lower edges of said side walls, said casing being mounted on said frame so that said bottom wall is moved along the surface of a field when the shredder is in use, said casing having a forward feed opening adjacent said hammer unit and bottom wall for the reception of the row crop which is projected therethrough by movement of the shredder along a crop row, and said casing also having an opening for the discharge therefrom of portions of the crop which have been shredded by said hammer unit; and a plurality of spaced parallel rod-like members removably fixed to said casing and extending across said discharge opening to provide a grate through which the shredded crop portions must pass to be discharged from said housing, the spacing between said members being substantially greater than the diameter of said members.

12. In a farm row crop shredder having a wheeled supporting frame adapted to be moved through a field: a rotary hammer unit mounted on said frame for rotation on a horizontal axis, said unit including a plurality of swingably mounted hammer bars; and a casing carried by said frame and enclosing said hammer unit to form a chamber within which said unit is rotatable, said casing comprising a pair of opposing side walls projecting downwardly beyond the lowermost portion of said hammer unit, a top wall, said side and top walls having front edges defining a feed opening ahead of the hammer unit for the reception of the row crop therethrough, and a horizontally extending bottom wall between said side walls underneath and close to said hammer unit, said bottom wall having a V-shaped front opening bounded by converging edges extending inwardly from the sides of said feed opening to a point directly below the front portion of said hammer unit, said casing being mounted on said frame so that the bottom wall is moved along the surface of a field when the shredder is in use, and said casing also having an opening for the discharge therefrom of portions of the crop which have been shredded by the hammer unit.

13. In a farm row crop shredder having a wheeled supporting frame adapted to be moved through a field: a rotary hammer unit mounted on said frame for rotation on a horizontal axis, said unit including a plurality of swingably mounted hammer bars; and a casing carried by said frame and enclosing said hammer unit to form a chamber within which said unit is rotatable, said casing comprising a pair of opposing side walls projecting downwardly beyond the lowermost portion of said hammer unit; a top wall, said side and top walls having front edges defining a feed opening ahead of the hammer unit for the reception of a row crop therethrough, a horizontally extending bottom wall between said side walls underneath and close to said hammer unit, said bottom wall having a V-shaped front opening bounded by converging edges extending inwardly from the sides of said feed opening to a point directly below a front portion of said hammer unit; and a pair of crop gathering members on said casing extending divergingly forwardly from opposite sides of said feed opening and having inner wall surfaces alined with the converging edges of said bottom wall opening, said casing being mounted on said frame so that the bottom wall is moved along the surface of a field when the shredder is in use, and said casing also having an opening for the discharge therefrom of portions of the crop which have been shredded by the hammer unit.

14. In a farm row crop shredder having a wheeled supporting frame adapted to be moved through a field: a rotary hammer unit mounted on said frame for rotation on a horizontal axis, said unit including a plurality of swingably mounted hammer bars; and a casing carried by said frame and enclosing said hammer unit to form a chamber within which said unit is rotatable, said casing comprising a pair of opposing side walls projecting downwardly beyond the lowermost portion of said hammer unit, a top wall, said side and top walls having front edges defining a feed opening ahead of the hammer unit for the reception of the row crop therethrough, a horizontal bottom wall plate connected to the lower edge of each of said side walls, said plates extending toward each other underneath and close to said hammer unit with their inner edges spaced apart a predetermined distance to provide a longitudinally extending slot therebetween, said bottom wall plates having front edges extending convergingly inwardly from the sides of said feed opening and joining the inner edges of said plates at points directly below a front portion of said hammer unit, said casing being mounted on said frame so that the bottom wall plates are moved along the surface of a field when the shredder is in use, and said casing also having an opening for the discharge therefrom of portions of the crop which have been shredded by the hammer unit.

JOSEPH HABAN.

References Cited in the file of this patent

UNITED STATES PATENTS

| Number | Name | Date |
| --- | --- | --- |
| 1,648,341 | Goble | Nov. 8, 1927 |
| 1,893,871 | Romera | Jan. 10, 1933 |
| 2,105,803 | Barnes | Jan. 18, 1938 |
| 2,346,103 | Everett | Apr. 4, 1944 |
| 2,368,331 | Seaman | Jan. 30, 1945 |
| 2,477,795 | Gehl | Aug. 2, 1949 |
| 2,479,510 | Pollard et al. | Aug. 16, 1949 |
| 2,484,802 | Aasland | Oct. 18, 1949 |